March 10, 1931.  J. D. NIES  1,795,313
ELECTRIC MOTOR SUPPORT
Filed Oct. 11, 1926
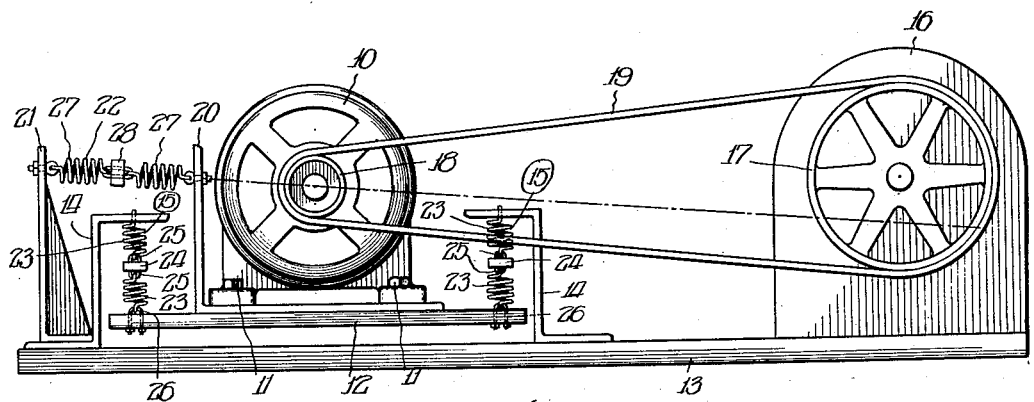
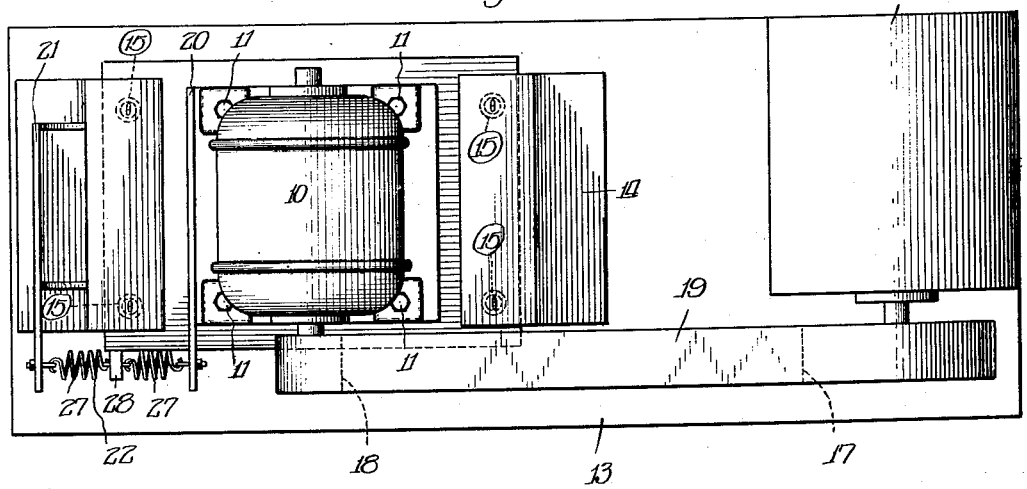
Witness:
R. Burkhardt
Inventor
John D. Nies,
By Wilkinson, Huxley, Byron & Knight.
Attys.

Patented Mar. 10, 1931

1,795,313

UNITED STATES PATENT OFFICE

JOHN D. NIES, OF CHICAGO, ILLINOIS, ASSIGNOR TO KIMBLE ELECTRIC COMPANY, OF CHICAGO, ILLINOIS, A CORPORATION OF ILLINOIS

ELECTRIC-MOTOR SUPPORT

Application filed October 11, 1926. Serial No. 140,832.

My invention relates to improved sound dampening supports for machines, and more particularly to a support in which all connecting elements interposed between the machine and the ultimate supporting surface are adapted to intercept and absorb vibrations given off incident to the operation of the machine to render the machine totally isolated with respect to the transmission of sound vibrations.

The sound produced by the operation of a machine subject to vibration during its operation is caused by the transmission of the vibration to the atmosphere in amount sufficient to produce a substantial sound disturbance. It is has been found that the extent of the air disturbance is dependent upon the amount of vibrating surface exposed to the air as well as the intensity of the vibration. In practice, the surface exposed to the atmosphere of any small machine or machine of ordinary size is not sufficient under the vibratory action of that machine while operating to cause a substantial annoyance by noise produced incident to the operation. The disturbing influence effected in such a case is found to be due to the transmission of vibrations through the supports for the machine or other connections extending between the motor and the ultimate supporting surface, such as the flooring and walls of a building structure which act as a sounding board, exposing large surfaces to the atmosphere with the result that an appreciable sound disturbance or noise is produced.

To this end, one of the objects of my invention is to provide a mounting for machinery in which all of the connections between the machine and its supporting base are constructed to isolate the machine from the ultimate supporting surface with respect to the transmission of sound vibrations.

Another object of my invention is to provide a support for machinery in which elements are interposed between the machine and the ultimate supporting surface, comprising a vibration absorbing means, the surface of which has a comparatively small sound producing area.

Another object of my invention is to provide a sound dampening support for machines comprising resilient means interposed between the machine and a supporting surface, the resilient means being provided intermediate its length with a rigid vibration absorbing body, which body has a relatively small sound producing surface.

These and other objects are acomplished by means of the arrangement disclosed on the accompanying sheet of drawings, in which—

Figure 1 is a side elevation of a motor connected in driving relation with a driven element, the motor being mounted by means constructed in accordance with my invention; and, Figure 2 is a plan view of the mechanism shown in Figure 1.

The various novel features of the invention will be apparent from the following description and drawing and will be particularly pointed out in the appended claims.

Referring to the drawing, it will be noted that my improved support is adapted to be used in connection with a machine such as a motor 10 attached by suitable bolts 11 to a base plate 12. The base plate 12 forms a sub-base suspended from the main base 13 through the instrumentality of the brackets 14 and my improved connectors represented generally as 15. As shown in the figures, the motor 10 is positioned in driving relation with a mechanism 16 to be driven, having the pulley wheel 17 connected to the pulley 18 of the motor by the flexible belt 19. Mounted on the sub-base 12 is an upwardly projecting arm 20 positioned in opposed relationship to the upwardly projecting bracket 21 mounted on the base 13.

Positioned between the brackets 21 and 20 is a connecting member designated generally as 22 which serves to place the belt 19 under tension and which is constructed in accordance with my invention. The belt tightening member 22 is positioned in the plane of the belt and in line with the resultant of the tensions in the two runs of the belt in order to avoid setting up force couples tending to throw the motor shaft and the driven shaft out of parallel. By mounting bracket 21 on the same base with driven machine 16, all forces are self balanced and external forces are avoided.

Referring now to the connecting elements designated generally at 15 which serve to dampen the sound incident to the operation of the motor, I provide two resilient elements such as springs 23 and an intermediate weight 24 connected as by means of the eyes 25 between the adjacent ends of the spring members. The lower spring member is connected to the sub-base by means of a U bolt 26. The weight member 24 is preferably of some heavy material so that it will have a maximum mass for the surface exposed to the atmosphere. To produce this characteristic, the weights may be in the shape of small spheres but are also found to serve well in the form of small solid cylinders such as shown in Figure 1 of the drawing, this last shape being preferable due to the ease in manufacture. The spring element 22 embodies exactly the same principle embodied in the connecting elements 15, the structure being composed of spring elements 27 having a weight 28, disposed between the adjacent ends of the spring.

In operation, my improved mounting is found to effect a substantially noiseless operation of a machine, the vibrations set up incident to running being transmitted through the sub-base 12, springs 23 to the small weights 24 which are freely movable and act to intercept and absorb the vibrations to prevent their transmission further to the ultimate supporting surface. The vibration absorbing operation is based upon the principle of inertia, considerable energy being required to set the weights 24 into vibratory action. This results in a partial expenditure of the vibrating energy, the connected spring between the weight and the support serving to take up a large portion of the remaining vibrations, the result being that the Z brackets 14 are substantially free from vibrations set up by the operation of the motor 10. The surface of the motor is such as compared with the vibration in question that the motor itself, isolated in regard to vibration transmission in the manner described, will not produce sufficient air disturbance to produce an undesirable noise. The sound absorbing principle is also embodied in the spring take-up 22 for the reason that the motor must be entirely isolated in regard to sound transmission from its supporting element. Consequently, the spring belt tightening member 22, constructed in accordance with my principle, serves well in a dual capacity of creating a tension on the belt and of absorbing sound vibrations produced when the motor is in operation.

It is to be understood that the principle embodied in my invention requires a total isolation of the motor or machine from its ultimate supporting base, which necessitates that a connecting element constructed in accordance with my invention be used at each location where a connection of any kind is found between these elements. In some cases, as for instance, on refrigerating apparatus, it may be desirable to mount a motor and a compressor on a single base, in which case it will be necessary to provide the tubing which connects the compressor with the other parts of the device with my vibration absorbing means. In such a case the tubing would be formed with a weight in a manner to intercept and absorb sound producing vibrations, in accordance with the principles of this invention, and it is to be further understood that it is within the scope of my invention to supply all connections between the vibrating element and its supporting surface with my improved connecting device so that a complete isolation of the vibrating machine may be effected.

I claim:

1. A device of the character described comprising in combination, a support, a device subject to vibration, and a vibration absorbing connection for supporting said device from said support, said connection comprising a flexible and extensible yielding element having one end attached to said support and the other end attached to said device and a relatively heavy mass suspended at an intermediate portion of its length between said points of attachment.

2. A device of the character described comprising in combination, a support, a device subject to vibration, and a vibration absorbing connection for supporting said device from said support, said connection comprising a flexible and extensible yielding element having one end attached to said support and the other end attached to said device and a relatively heavy mass suspended at an intermediate portion of its length between said points of attachment, said mass being of such shape as to provide a relatively small external surface for its mass.

3. A device of the character described comprising in combination, a support, a device subject to vibration, and a vibration absorbing connection for supporting said device from said support, said connection comprising a coil spring attached at its ends to said support and device respectively, and having a weight secured thereto intermediate its length between said points of attachment.

4. A device of the character described comprising in combination, a support, a device subject to vibration, and a vibration absorbing connection for supporting said device from said support, said connection comprising a coil spring attached at its ends to said support and device respectively, and having a weight secured thereto intermediate its length between said points of attachment, said weight being of such shape as to provide a relatively small external surface for its mass.

5. In a device of the character described, a motor having a base, a support for said motor having portions overlying said base, vibration absorbing connections extending between said support and base, each comprising a flexible and extensibly yielding member attached at its ends to said support and motor respectively, and having a weight suspended intermediate its length between said points of attachment.

Signed at Chicago, Illinois, this 7th day of October, 1926.

JOHN D. NIES.